(12) United States Patent
Solomon et al.

(10) Patent No.: US 7,386,187 B2
(45) Date of Patent: Jun. 10, 2008

(54) METHOD AND SYSTEM FOR PSEUDO-AUTONOMOUS IMAGE REGISTRATION

(75) Inventors: Ofer Solomon, Maalot (IL); Amos Ben Yishai, Yuvalim (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 635 days.

(21) Appl. No.: 11/072,340

(22) Filed: Mar. 7, 2005

(65) Prior Publication Data

US 2005/0271301 A1 Dec. 8, 2005

(30) Foreign Application Priority Data

Mar. 7, 2004 (IL) .................................. 160765

(51) Int. Cl.
*G06K 9/36* (2006.01)
(52) U.S. Cl. .................... 382/276; 382/278; 382/293; 348/129; 348/135
(58) Field of Classification Search ............... 382/216, 382/219, 278, 293; 348/129, 130, 135
See application file for complete search history.

(56) References Cited

U.S. PATENT DOCUMENTS

| | | | | |
|---|---|---|---|---|
| 5,999,210 | A * | 12/1999 | Nemiroff et al. | 348/135 |
| 6,198,501 | B1 * | 3/2001 | Nemiroff et al. | 348/135 |
| 6,636,635 | B2 * | 10/2003 | Matsugu | 382/218 |
| 6,754,367 | B1 * | 6/2004 | Ito et al. | 382/103 |
| 6,996,291 | B2 * | 2/2006 | Nahum | 382/278 |
| 2002/0196248 | A1 | 12/2002 | Kraus | |

FOREIGN PATENT DOCUMENTS

IL 111069 9/1994

OTHER PUBLICATIONS

IL Application #158685 Methods and Systems For Communication And Displaying Targets Sroka & Solomon Filed on Oct. 30, 2003.

* cited by examiner

*Primary Examiner*—Yosef Kassa
(74) *Attorney, Agent, or Firm*—Mark M. Friedman Ltd.

(57) ABSTRACT

A method and system for providing a platform with pseudo-autonomous correlation between a perspective view generated by a platform-based imaging sensor and an orthogonal photographic representation includes storing on the platform a reference perspective view and parameters of a primary mapping transformation corresponding to a mapping between the orthogonal photographic representation and the reference perspective image. The platform then derives a mapping of equivalent points between a current perspective view and the orthogonal photographic representation by onboard processing of the current perspective view relative to the reference perspective view.

14 Claims, 6 Drawing Sheets

METHOD AND SYSTEM FOR PSEUDO-AUTONOMOUS IMAGE REGISTRATION

FIELD AND BACKGROUND OF THE INVENTION

The present invention relates to image correlation and, in particular, it concerns a platform with pseudo-autonomous image registration.

It is known to perform image registration between images viewed at different viewing angles. One example of particular interest is registration of a perspective image with an orthogonal photographic representation which allows features in the perspective image to be associated with their geographic locations. The techniques for performing such registration per se are well known in the art and will not be dealt with here in detail.

The following patent documents, mentioned as illustrative of applications of image registration techniques, are hereby incorporated by reference for all purposes as if fully set forth herein. Israeli Patent No. 111069 to Sroka et al. describes a method and system for marking object images acquired at high zooming by an airborne imaging device on a reference image having a wide field of view of the scene. U.S. Patent Application Publication No. 2002/0196248 to Kraus et al. describes a method for sharing visual information between a number of command and control ("C&C") base units. Co-pending, co-assigned Israeli Patent Application No. 158685, which is unpublished at the date of filing this application and does not constitute prior art, extends these concepts to bi-directional communication between platforms via geographic coordinates which are represented in the local perspective view.

Turning now to FIG. 1, this shows a typical example of a scheme for implementing image correlation for an airborne platform with an imaging system, for example an unmanned aerial vehicle ("UAV") 16. An image of a region of interest is derived from a camera having an imaging sensor 10 operated by a camera controller unit 14 and is transmitted via wireless transceivers 20, 22 to a base station 18, where it is processed by a processing system 24 and may be presented on a display 12 located at the base station or any other desired location. Camera controller unit 14 typically operates an optical zoom of imaging sensor 10 for selectively generating views with relatively wide field of view (FOV) and relatively narrow FOV. A "frozen" wide angle view is optionally displayed on a second display 26, preferably with a frame indicating the region of the zoomed view currently being displayed on display 12 to facilitate user orientation. A similar system and various additional preferred features for operation of the system are described in the aforementioned Israeli Patent No. 111069.

Each base unit 18 is also provided with reference data 30 corresponding to an orthogonal photographic representation of a region overlapping at least part of the field of view of the perspective view of imaging sensor 10. The orthogonal photographic representation is preferably associated with a defined geographic coordinate system, typically corresponding to the standard longitude-latitude or "north-south" coordinate system defined globally across the surface of the Earth. Finally in structural terms, the base unit 18 is typically in communication with other base units or other entities via a wireless data communication system, such as a data-link system, represented by transceiver 32.

FIG. 2 illustrates the relationship between the images/views received by the base unit 18. Specifically, there are shown a real-time detailed narrow FOV perspective image 40, a frozen wide-angle perspective image 42 and an orthogonal photographic representation 44. The wide-angle image is typically necessary to provide sufficient data for reliable correlation with the orthogonal photographic representation. As a result, correlation between the perspective view and the orthogonal photographic representation is performed as a two-step correlation as illustrated in FIG. 3. Specifically, the wide FOV image 42 is correlated with the orthogonal photographic representation 44 to generate a first mapping transformation $T_1$, and the narrow FOV image 40 is correlated with the wide FOV image 42 to generate a second mapping transformation $T_2$. The combination of mapping transformations $T_1$ and $T_2$ or their, inverses together fully define the mapping between the perspective image 40 and the orthogonal photographic representation 44 in both directions, for example, allowing a target 46 identified in perspective view 40 to be associated with a geographic coordinate in orthogonal representation 44 or the reverse.

It should be noted that the entire image correlation processing is performed at base unit 18 remote from the data gathering platform 16. This is necessitated by the heavy data processing and huge quantities of data typically involved in image registration of this type, rendering it impractical to perform the processing locally for each platform. Specifically, the data storage and processing requirements of correlating images to a geographical database typically require a server system with multiple parallel processors and corresponding instant-access mass-data storage systems. These requirements render it impractical for all but the most massive mobile platforms to carry a self-contained geographic-database image registration system. Furthermore, the need for continual updating of information in the geographical database encourages a centralized processing approach.

As a result of this centralized processing approach, each mobile platform is required to continuously download sampled images to the remote base unit site. This occupies a disproportionate amount of communication bandwidth, and renders the mobile platform completely dependent upon the base unit. The continuous computational load on the base unit also limits the number of such platforms which can be served by a given base unit.

There is therefore a need for a method and system which would provide pseudo-autonomous image correlation for a platform-based system.

SUMMARY OF THE INVENTION

The present invention is a system and method for providing a platform with pseudo-autonomous correlation between a perspective view generated by a platform-based imaging sensor and an orthogonal photographic representation.

According to the teachings of the present invention there is provided, a method for providing a platform with pseudo-autonomous correlation between a perspective view generated by a platform-based imaging sensor and an orthogonal photographic representation, the method comprising: (a) storing on the platform: (i) a reference perspective view at least partially overlapping a current field of view of the imaging sensor, and (ii) parameters of a primary mapping transformation corresponding to a mapping between the orthogonal photographic representation and the reference perspective image; (b) obtaining a current perspective view from the imaging sensor; and (c) employing a processing system located on the platform to: (i) correlate the current perspective view with the reference perspective view so as to generate a secondary mapping transformation between the current perspective view and the reference perspective view, and (ii) use the primary and secondary mapping transformations to map equivalent points in at least one direction between the current perspective view and the orthogonal photographic representation.

According to a further feature of the present invention, the current perspective view has a field of view corresponding to less than ten percent of an area of a field of view of the reference perspective view.

According to a further feature of the present invention, the reference perspective view is derived from the imaging sensor, and wherein the parameters of a primary mapping transformation are derived by: (a) downloading the reference perspective view from the platform to a remote processing system; (b) employing the remote processing system to correlate the reference perspective view with the orthogonal photographic representation so as to generate the parameters; and (c) uploading the parameters from the remote processing system to the platform.

According to a further feature of the present invention, a mismatch criterion between the current perspective view and the reference perspective view is evaluated; and conditional upon a result of the mismatch criterion evaluation, the imaging sensor is employed to generate a new reference perspective view and repeating the steps of: downloading; employing the remote processing system; and uploading.

According to a further feature of the present invention, wherein the platform is an airborne platform.

According to a further feature of the present invention, the orthogonal photographic representation has a defined geographic coordinate system.

According to a further feature of the present invention, the reference perspective view is derived from a source other than the imaging sensor, the platform being an airborne platform, the step of storing being performed prior to launch of the platform.

According to a further feature of the present invention, the storing includes storing a plurality of the reference perspective views and a plurality of sets of corresponding parameters of the primary mapping transformation, the method further comprising selecting one of the plurality of the reference perspective views at least partially overlapping the current field of view of the imaging sensor for correlating with the current perspective view.

There is also provided according to the teachings of the present invention, an image correlation system for providing pseudo-autonomous platform-based correlation between a perspective view generated by a platform-based imaging sensor and an orthogonal photographic representation, the system comprising: (a) a platform-based imaging sensor for generating perspective views; (b) a platform-based data storage device for storing: (i) a reference perspective view, and (ii) parameters of a primary mapping transformation corresponding to a mapping between the orthogonal photographic representation and the reference perspective image; and (c) a platform-based processing system associated with the imaging sensor and with the data storage device, the processing system being configured for: (i) correlating a current perspective view derived from the imaging sensor with the reference perspective view so as to generate a secondary mapping transformation between the current perspective view and the reference perspective view, and (ii) employing the primary and secondary mapping transformations to map equivalent points in at least one direction between the current perspective view and the orthogonal photographic representation.

According to a further feature of the present invention, there is also provided: (a) a remote processing system including a remote data storage device storing the orthogonal photographic representation; and (b) a communication link between the platform-based processing system and the remote processing system, wherein the remote processing system is configured to: receive an image downloaded from the imaging sensor via the communication link, the image being designated as a reference perspective view; correlate the reference perspective view with the orthogonal photographic representation so as to generate the parameters; and upload the parameters via the communication link to the platform-based data storage device.

According to a further feature of the present invention, the communication link is a wireless communication link.

According to a further feature of the present invention, the platform is an airborne platform.

According to a further feature of the present invention, the orthogonal photographic representation has a defined geographic coordinate system.

According to a further feature of the present invention, the platform-based data storage device is configured to store a plurality of the reference perspective views and a plurality of sets of corresponding parameters of the primary mapping transformation, the platform-based processing system being further configured to select one of the plurality of the reference perspective views for correlating with the current perspective view.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system and method for providing a platform with pseudo-autonomous correlation between a perspective view generated by a platform-based imaging sensor and an orthogonal photographic representation.

The principles and operation of systems and methods according to the present invention may be better understood with reference to the drawings and the accompanying description.

Figure 3:
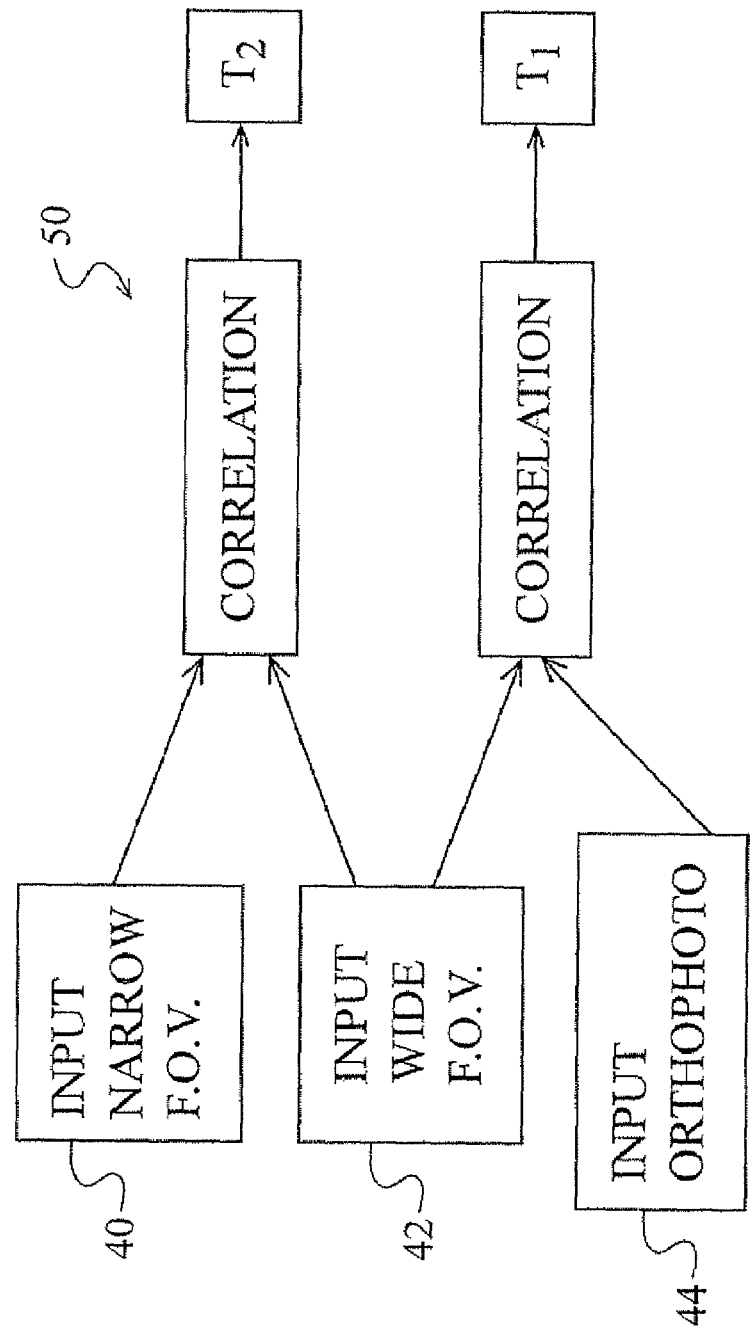
FIG. 3 is a schematic representation of a two-stage correlation performed by the system of FIG. 1.

By way of introduction, the fundamental concept underlying the present invention is the observation that the two-stage correlation calculation illustrated in FIG. 3 can be subdivided between two locations. Specifically, the calculation of the primary mapping transformation between the orthogonal photographic representation and the wide FOV reference image, which involves very large quantities of data and imposes a heavy processing load, can be performed at a remote location to determine the parameters of the mapping. This mapping remains constant for as long as the given reference image is being used. The secondary mapping, on the other hand, between the perspective reference view 42 and the current perspective view 40 involves very much less data and a much smaller processing load, but must be updated for each new camera view. By providing a platform with the primary mapping parameters calculated at a remote location and by using a platform-based processing system to derive the secondary mapping, the platform is provided with the ability to autonomously correlate newly acquired perspective views with a coordinate system based on the orthogonal photographic representation. This in turn allows locations within the newly acquired images to be related directly to the geographical coordinate system, allowing for concise and precise coordinate-based communication with the base unit and other platforms for purposes of tracking, detection, orientation and navigation. By facilitating bi-directional communication using N-S coordinates to designate locations of interest, communication can be achieved is a very efficient compact data format at high speeds with very narrow bandwidth usage.

Figure 4:
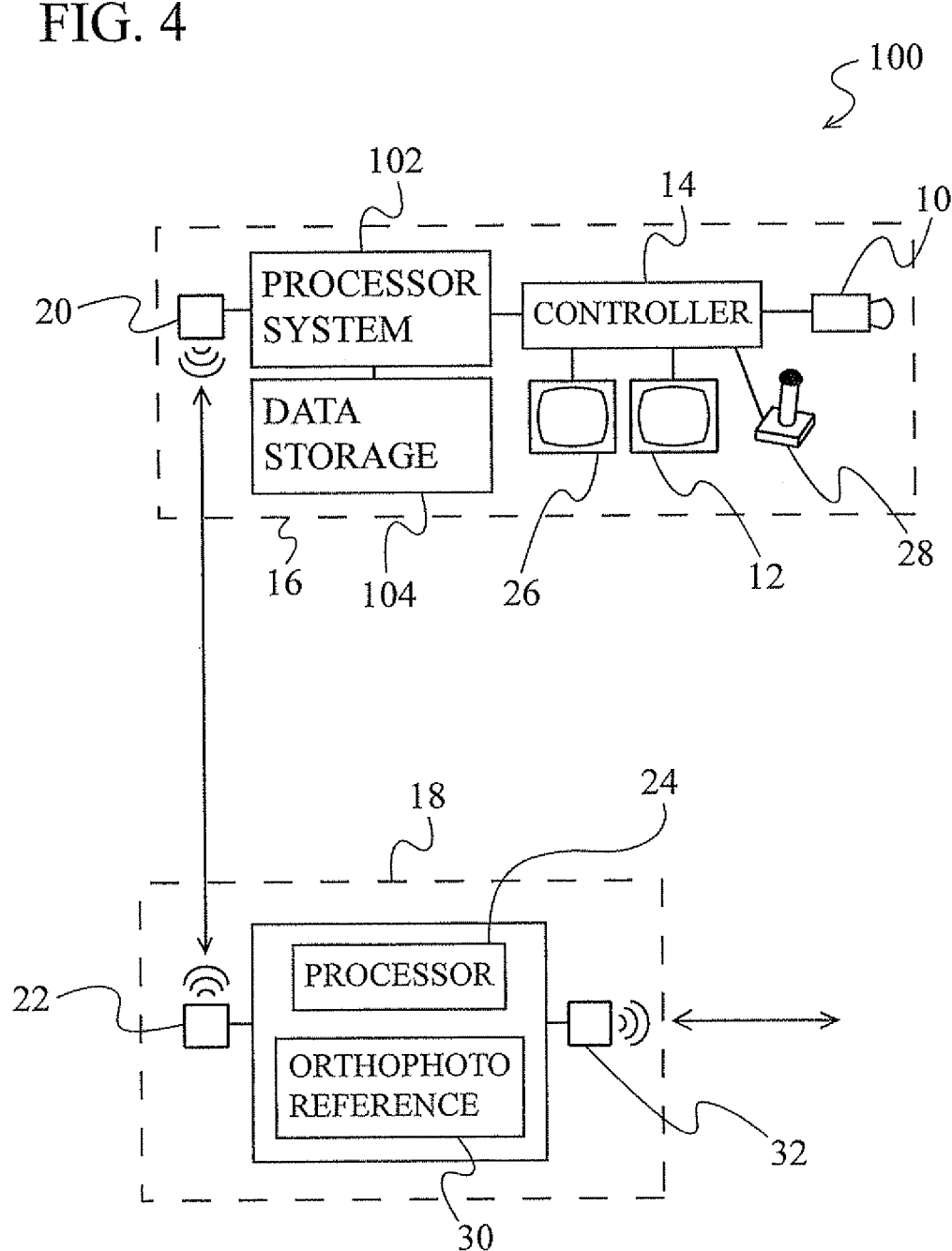
FIG. 4 is a, schematic representation of a system, constructed and operative according to the teachings of the present invention, for providing a platform with pseudo-autonomous correlation between a perspective view generated by a platform-based imaging sensor and an orthogonal photographic representation.
Figure 5:
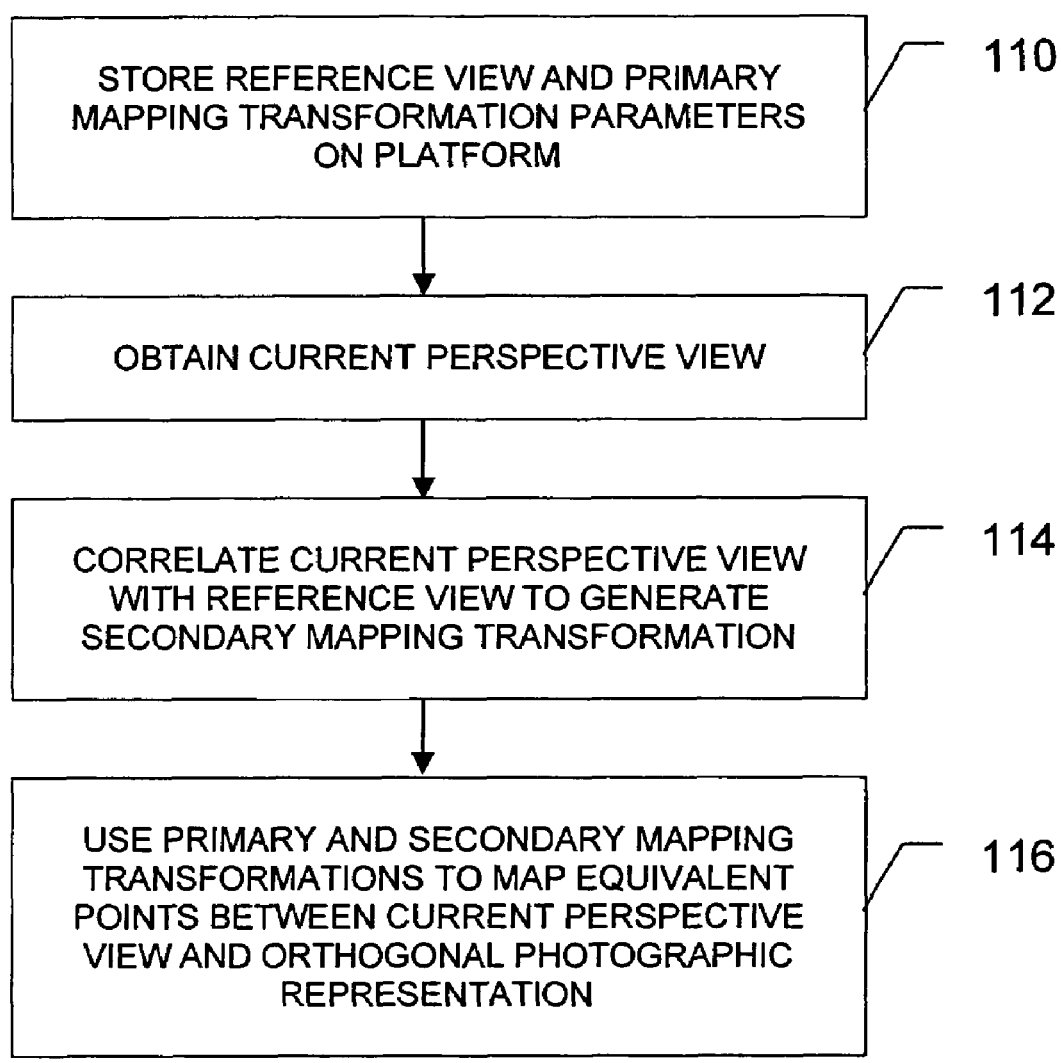
FIG. 5 is a flow diagram illustrating the basic operation of the system of FIG. 4 and the corresponding method according to the teachings of the present invention.
Figure 6:
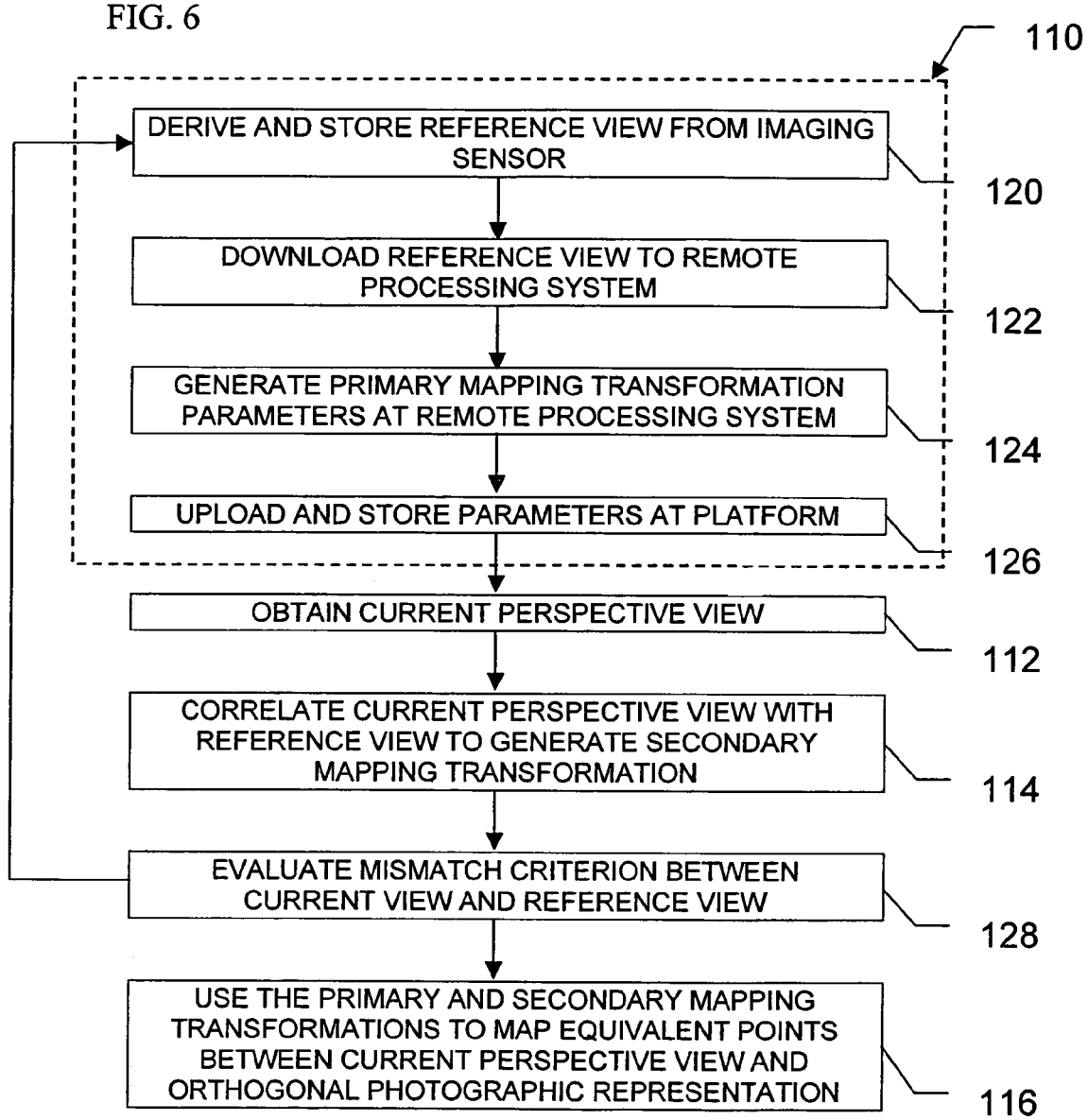
FIG. 6 is a flow diagram illustrating a preferred implementation of the method of FIG. 5.

Referring now to the drawings, FIGS. 4-6 show a preferred implementation of an image correlation system 100, constructed and operative according to the teachings of the present invention, and the corresponding method, for providing pseudo-autonomous platform-based correlation between a perspective view generated by a platform-based imaging sensor and an orthogonal photographic representation. System 100 is illustrated here as a modification of the system of FIG. 1, with equivalent elements similarly labeled.

Generally speaking, system 100 includes at least platform-based imaging sensor 10 for generating perspective views, a platform-based processing system 102 and a platform-based data storage device 104. Typically, although not essentially, system 100 also includes various additional displays and controls, such as those illustrated in FIG. 1 or others, to provide corresponding or additional functionality for camera function control (pan, zoom etc.), target designation and other input or output functions.

The basic operation of system 100 and the corresponding method are illustrated in FIG. 5. First, in step 110, a reference perspective view (e.g. view 42 above) together with a corresponding set of parameters defining a primary mapping transformation are stored in data storage device 104. The reference perspective view must at least partially overlap a current or intended field of view of imaging sensor 10. The primary mapping transformation $T_1$ corresponds to a mapping between the orthogonal photographic representation (e.g. representation 44 above) and the reference perspective image. At step 112, a current perspective view is obtained from imaging sensor 10. Processing system 102 is then used at step 114 to correlate the current perspective view (e.g. view 40 above) with the reference perspective view so as to generate a secondary mapping transformation $T_2$ between the current perspective view and the reference perspective view. The combination of the parameters defining $T_1$ together with the calculated transformation $T_2$ allow processing system 102 to map equivalent points in at least one, and preferably both directions, between the current perspective view and the orthogonal photographic representation (step 116), thereby enabling processing system 102 to convert between N-S coordinates and image pixels in either direction.

Figure 1:
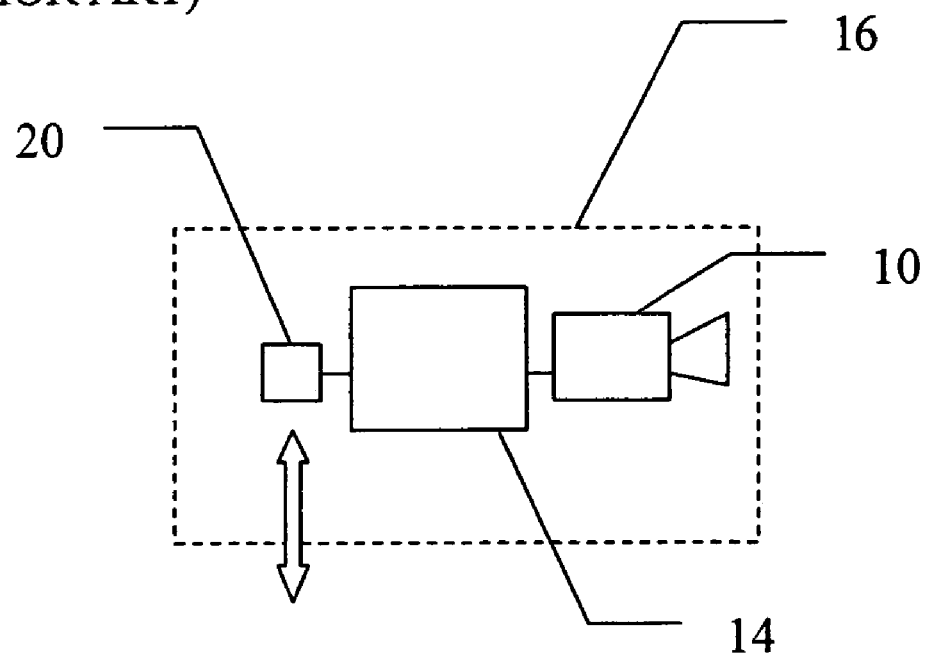
FIG. 1 is a schematic representation of a conventional system for providing a user with correlation between a perspective view generated by a platform-based imaging sensor and an orthogonal photographic representation.
Figure 1:
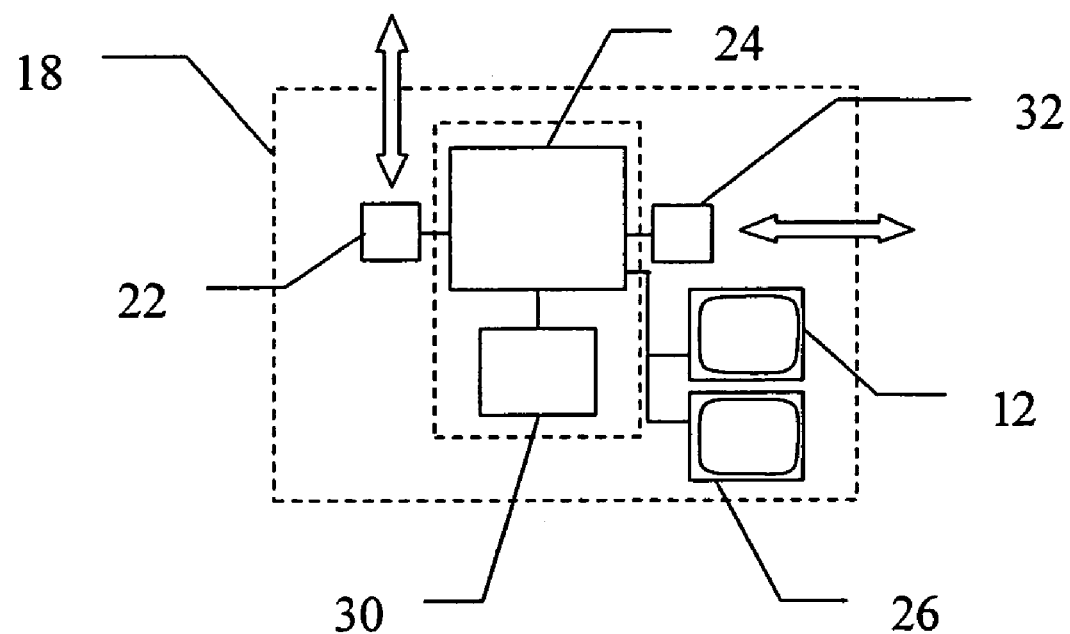
Figure 2:
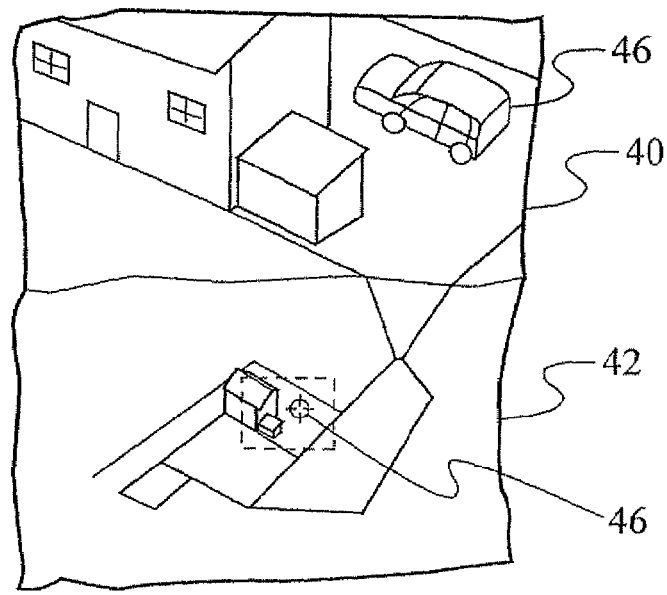
FIG. 2 is a schematic representation of the images used by the system of FIG. 1.
Figure 2:
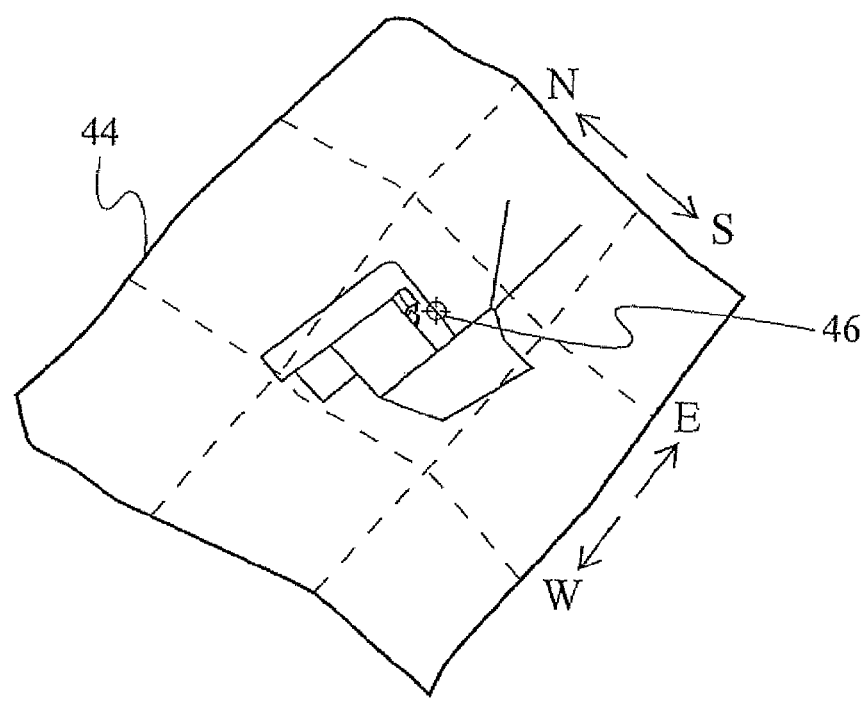

It will immediately be appreciated that the present invention provides the platform with a high degree of autonomy and greatly reduces the data transfer requirements compared to the system of FIG. 1. Specifically, continuous download of images from platform 16 to a base unit 18 is avoided, instead allowing concise communication between platform 16 and other platforms or base units in terms of coordinates within the orthogonal photographic representation or absolute geographic coordinates. Furthermore, the computational burden on the base unit is greatly reduced, freeing up its resources for alternative tasks and/or allowing a single base unit to manage many more platforms. These and other advantages of the system and method of the present invention will be better understood in view of the following detailed description.

Before proceeding further, it will be useful to define certain terminology as used herein in the description and claims. Firstly, the word "perspective" is used herein to refer to any non-orthogonal viewing direction. The phrase "different perspective views" is used to refer to two views which have non-coincident viewing directions. The phrase "current perspective view" is used to refer to a perspective view currently being processed, and preferably, the view most recently input from imaging sensor 10.

In a further issue of terminology, reference is made herein in the description and claims to an "orthogonal photographic representation". The term "orthogonal" is used herein to refer to a real or processed image which has a vertical effective viewing direction over its entire area. Satellite images may closely approximate to such conditions. Alternatively, other aerial images may be combined by image processing to construct the required view. This technology is well known in the art and will not be described further herein. Most preferably, the orthogonal photographic representations used by the present invention are associated with a geographic coordinate system so that the mapping transformations link locations within the current perspective view directly to geographical locations.

The term "photographic representation" is used herein to refer to a real or simulated image which simulates the properties of an image generated by a corresponding type of imaging sensor. Thus, the photographic representation typically approximates to an aerial photograph taken at visible wavelengths. In certain cases, an orthogonal photographic representation approximating to a thermal aerial photograph may be used. The platform of the present invention may, employ different types of imaging sensors 10, and the photographic representation need not be of the same image type.

The term "platform" is used herein in the description and claims to refer to any platform from which a perspective view of a region of interest can be obtained. Although illustrated herein in a preferred implementation on an airborne platform, it should be noted that the present invention is not limited to airborne platforms, and can equally be used where an imaging sensor is located on other platforms such as observation towers or look-out points. It should also be noted that the platform need not be a manned platform. In the case of an unmanned platform, such as an unmanned aerial vehicle ("UAV"), the user displays and input device may be omitted, or may be located at the corresponding base unit.

The term "remote" is used herein to refer to any location not on the platform. Typically, although not necessarily, the remote components of the present invention are located at a base unit in real-time wireless communication with the platform.

The system and method of the present invention are described as "pseudo-autonomous" in the sense that they operate within certain bounds in an autonomous manner to derive mappings between a current perspective view and an orthogonal reference while still being dependent upon an external source of data for intermittent updates, as will be described further below.

Turning now to the features of the present invention in more detail, it: should be noted that the reference perspective views may originate from any source including, but not limited to, imaging sensor 10. Thus, by way of example, for a fixed lookout position, one or more reference views may be generated during an initial one-time setup procedure and the primary transformation $T_1$ for each calculated. These views may be generated by any suitable imaging sensor located at the lookout position or nearby, and need not be generated by imaging sensor 10 used subsequently for implementation of the present invention. Similarly, for an airborne platform, the reference perspective views may optionally be obtained from a first platform and then subsequently used by a second platform to provide pseudo-autonomous operation according to the teachings of the present invention. By pre-loading a library of different views and their corresponding pre-calculated mapping transformations, it is possible to extend the pseudo-autonomous operation of the platform to substantially eliminate the need for image download and processing during operation. Switching between pre-loaded reference views may be performed automatically based upon various parameters such as: the current geographical position of the platform as derived from GPS or from the image correlation itself, the current attitude of the platform and viewing angles of the imaging sensor, and/or by the direction of exit of the FOV from the previously-used reference image.

Preferably, the reference perspective view has a FOV significantly greater than the current perspective view. Specifically, the current perspective view preferably has a FOV corresponding to less than ten percent of the FOV of the reference perspective view, and more preferably less than three percent. This allows free movement of the imaging sensor FOV over a relatively large region of interest without requiring replacement of the reference view.

Turning now to FIG. 6, this shows a preferred implementation of the method of the present invention where the reference image is generated, and periodically updated as needed, by use of imaging sensor 10. In this case, step 110 is performed by initially deriving and storing the reference perspective view from imaging sensor 10 (step 120) and downloading the reference view to the remote processing system, identified by numeral 24 in FIG. 4 (step 122). The intensive calculation required to generate primary mapping transformation $T_1$ is then performed by remote processing system 24 by use of the large database containing orthogonal photographic representation reference data in remote data storage device 30 (step 124). The parameters of the registration matrix are uploaded to the platform and stored in data storage device 104 (step 126). The system and method are then ready to proceed with steps 112, 114 and 116 as before.

According to a further preferred feature of the present invention illustrated here, the system evaluates a mismatch criterion between the current perspective view and the reference perspective view (step 128). The mismatch criterion tests whether a new reference perspective view should be obtained. In a simple implementation, the mismatch criterion may simply be a failure to achieve sufficient correlation between the current perspective view and the reference perspective view to establish reliable registration between them. Alternatively, the mismatch criterion may be a numerical calculation indicative of poor correlation, or of large angular discrepancy or incomplete FOV overlap between the images, to allow preemptive replacement of the reference image to avoid loss of registration. When the mismatch criterion evaluation indicates that the reference image should be replaced, the system preferably returns to step 120 to generate (or acquire) a new reference perspective view and the corresponding primary mapping transformation. Most preferably, during the remote processing to derive the new primary mapping transformation parameters, the platform-based system continues to function using the previous reference perspective view, only replacing it with the new reference perspective view when the corresponding transformation parameters are received. In this: manner, seamless continuous operation is ensured.

It will be appreciated that the above descriptions are intended only to serve as examples, and that many other embodiments are possible within the scope of the present invention as defined in the appended claims.

What is claimed is:

1. A method for providing a platform with pseudo-autonomous correlation between a perspective view generated by a platform-based imaging sensor and an orthogonal photographic representation, the method comprising:
   (a) storing on the platform:
      (i) a reference perspective view at least partially overlapping a current field of view of the imaging sensor, and
      (ii) parameters of a primary mapping transformation corresponding to a mapping between the orthogonal photographic representation and said reference perspective image;
   (b) obtaining a current perspective view from said imaging sensor; and
   (c) employing a processing system located on the platform to:
      (i) correlate said current perspective view with said reference perspective view so as to generate a secondary mapping transformation between said current perspective view and said reference perspective view, and
      (ii) use said primary and secondary mapping transformations to map equivalent points in at least one direction between said current perspective view and said orthogonal photographic representation.

2. The method of claim 1, wherein said current perspective view has a field of view corresponding to less than ten percent of an area of a field of view of said reference perspective view.

3. The method of claim 1, wherein said reference perspective view is derived from said imaging sensor, and wherein said parameters of a primary mapping transformation are derived by:
   (a) downloading said reference perspective view from the platform to a remote processing system;

(b) employing said remote processing system to correlate said reference perspective view with the orthogonal photographic representation so as to generate said parameters; and (c) uploading said parameters from the remote processing system to the platform.

4. The method of claim 3, further comprising:

(a) evaluating a mismatch criterion between said current perspective view and said reference perspective view; and (b) conditional upon a result of said mismatch criterion evaluation, employing said imaging sensor to generate a new reference perspective view and repeating said steps of: downloading; employing said remote processing system; and uploading.

5. The method of claim 1, wherein the platform is an airborne platform.

6. The method of claim 1, wherein the orthogonal photographic representation has a defined geographic coordinate system.

7. The method of claim 1, wherein said reference perspective view is derived from a source other than said imaging sensor, the platform being an airborne platform, said step of storing being performed prior to launch of said platform.

8. The method of claim 1, wherein said storing includes storing a plurality of said reference perspective views and a plurality of sets of corresponding parameters of the primary mapping transformation, the method further comprising selecting one of said plurality of said reference perspective views at least partially overlapping the current field of view of the imaging sensor for correlating with said current perspective view.

9. An image correlation system for providing pseudo-autonomous platform-based correlation between a perspective view generated by a platform-based imaging sensor and an orthogonal photographic representation, the system comprising:

(a) a platform-based imaging sensor for generating perspective views;

(b) a platform-based data storage device for storing:
 (i) a reference perspective view, and
 (ii) parameters of a primary mapping transformation corresponding to a mapping between the orthogonal photographic representation and said reference perspective image; and (c) a platform-based processing system associated with said imaging sensor and with said data storage device, said processing system being configured for:
 (i) correlating a current perspective view derived from said imaging sensor with said reference perspective view so as to generate a secondary mapping transformation between said current perspective view and said reference perspective view, and
 (ii) employing said primary and secondary mapping transformations to map equivalent points in at least one direction between said current perspective view and the orthogonal photographic representation.

10. The system of claim 9, further comprising:

(a) a remote processing system including a remote data storage device storing the orthogonal photographic representation; and (b) a communication link between said platform-based processing system and said remote processing system, wherein said remote processing system is configured to: receive an image downloaded from said imaging sensor via said communication link, said image being designated as a reference perspective view; correlate said reference perspective view with the orthogonal photographic representation so as to generate said parameters; and upload said parameters via said communication link to said platform-based data storage device.

11. The system of claim 10, wherein said communication link is a wireless communication link.

12. The system of claim 9, wherein the platform is an airborne platform.

13. The system of claim 9, wherein the orthogonal photographic representation has a defined geographic coordinate system.

14. The system of claim 9, wherein said platform-based data storage device is configured to store a plurality of said reference perspective views and a plurality of sets of corresponding parameters of the primary mapping transformation, said platform-based processing system being further configured to select one of said plurality of said reference perspective views for correlating with said current perspective view.

* * * * *